United States Patent [19]

Goossens

[11] Patent Number: 4,615,947
[45] Date of Patent: Oct. 7, 1986

[54] ACRYLIC PRIMER FOR ADHERING AN ORGANOPOLYSILOXANE

[75] Inventor: John C. Goossens, Mt. Vernon, Ind.

[73] Assignee: General Electric Company, Pittsfield, Mass.

[21] Appl. No.: 728,093

[22] Filed: Apr. 29, 1985

[51] Int. Cl.$^4$ ............................................. B03Q 27/36
[52] U.S. Cl. ..................................... 428/412; 525/100; 428/447; 428/451; 522/111
[58] Field of Search ............... 525/100; 428/412, 447, 428/451; 204/159.13, 159.16; 522/111

[56] References Cited

U.S. PATENT DOCUMENTS 3,644,566 2/1972 Kincheloe et al. ................. 525/100
3,849,357 11/1974 Wolf .................................... 525/100
4,188,451 2/1980 Humphry ............................ 428/331
4,224,211 9/1980 Kanazawa et al. ................. 525/100
4,439,494 3/1984 Olson .................................. 428/412

FOREIGN PATENT DOCUMENTS 59-07824 5/1984 Japan .

Primary Examiner—Melvyn I. Marquis
Attorney, Agent, or Firm—John W. Harbour; William F. Mufatti; Edward K. Welch, II

[57] ABSTRACT

A primer layer containing a thermoplastic or thermoset acrylic homogeneously admixed with an organopolysiloxane constituent increases the adhesion of abrasion and solvent resistant organopolysiloxane hardcoats to thermoplastic substrates.

11 Claims, No Drawings

ACRYLIC PRIMER FOR ADHERING AN ORGANOPOLYSILOXANE

This invention relates to primer layers used to adhere organopolysiloxane protective hardcoats to thermoplastic substrates. More particularly, this invention relates to blended acrylic primer layers containing an organopolysiloxane constituent which primer layers provide for improved adhesion of an organopolysiloxane protective hardcoat to a thermoplastic substrate.

BACKGROUND

The use of transparent material utilizing thermoplastic resin as a structural component is well known. Products made from many such thermoplastic resins, particularly polycarbonate resin, exhibit such properties as toughness, high transparency, good dimensional stability, excellent creep resistance, excellent thermal stability and the like. While thermoplastic resins, for example polycarbonate resin, are easily fabricated into the desired shape and have excellent physical and chemical properties, their scratch and abrasion resistance is relatively low.

In order to overcome low scratch and abrasion resistance, various known coatings have been recommended for use on non opaque plastics. Such coatings believed to exhibit the best degree of abrasion resistance are comprised of at least one silicone-containing compound. Especially preferred among the silicone containing coatings are those which employ the condensation product of a functional silane.

U.S. Pat. Nos. 3,451,838, 3,986,997 and 4,027,073 disclose organopolysiloxane coatings, compositions, and techniques for the application of such to polycarbonate substrate.

U.S. Pat. No. 3,707,397 describes a process for providing a hard coating on, inter alia, polycarbonate articles, said process including priming the polycarbonate surface with an adhesion promoting thermosettable acrylic and applying an organopolysiloxane onto the primed surface.

U.S. Pat. No. 4,207,357 describes a method for coating a polycarbonate article with a scratch-, mar-, abrasion-, and solvent-resistant colloidal silica filled organopolysiloxane coating. The method includes (i) applying and curing a primer composition of a thermosettable acrylic polymer and hydroxy ether and, (ii) applying and curing a hardcoat composition containing a colloidal silica filled organopolysiloxane. U.S. Pat. Nos. 4,242,381, 4,284,685, 4,308,317, and 4,353,959 describe a similar method and coating. Each of these patents disclose a thermoplastic or thermoset acrylic primer layer with an organopolysiloxane hardcoat.

The principle problem associated with the organopolysiloxane hardcoats is that of adhesion to the thermoplastic substrate. Acrylic primers, both thermoset and thermoplastic have been commonly used with good results as a primer layer to improve adhesion between hardcoats and substrates. However, even with the use of the acrylic primers, adhesion can often be erratic, leading to spot failures in the surface hardcoat. Spot failures result in degradation of, or damage to, the thermoplastic surface surrounding the area of the failure, particularly in abrasive or otherwise hostile conditions. Further, in spite of the good results obtained with the use of the acrylic primer, the long term effects of weathering will eventually result in adhesion failure.

Thus, it is desirable to lessen the erratic nature of the adhesion of organopolysiloxane hardcoats to the thermoplastic substrate while at the same time increasing the overall adhesion.

Therefore, it is an object of the present invention to provide an acrylic primer layer having increased levels of adhesion to the organopolysiloxane hardcoat.

It is another object of the present invention to provide a blended acrylic primer layer containing organopolysiloxane constituent.

It is still another object of the present invention to provide transparent thermoplastic substrates, especially polycarbonate substrates, having more firmly and consistently adhered thereto a protective organopolysiloxane hardcoat.

DESCRIPTION OF THE INVENTION

Briefly, according to the present invention, there are provided improved primer layers for adhering organopolysiloxane hardcoats to thermoplastic substrates, which primer layers have a dried thickness of from about 0.005 to about 0.15 mil and comprise:

(i) a thermoplastic acrylic or the solid reaction products of a thermosettable acrylic, and (ii) the solid condensation products of partial condensates of silanols derived from compounds having the general formula:

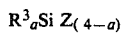

$$R^3{}_a Si\ Z_{(4-a)}$$

wherein $R^3$ is selected from a monovalent hydrocarbon radical or halogenated monovalent hydrocarbon radical, a may be 0, 1, or 2 and Z is independently a member of one or more hydrolyzable groups, the solid condensation products being in weight ratio to the acrylic of from about 1/14 to about 9/6. Preferably, the primer layer also contains a UV light absorbing compound.

Suitable thermoplastics for use as the substrate of the present invention include: acrylic and methacrylic polymers or copolymers; acetal homopolymers; acetal copolymers produced by polymerization of trioxane and ethylene oxide; epoxy resins; phenylene oxide based resins such as polyphenylene oxide and blends of polyphenylene oxide and styrene resins; polyamides; polyimides; poly(ether-imides); polyaryl ethers; polyesters; polyethylene; polyphenylene sulfides; polypropylene; polysulfones; ethylene polymers such as ethyl vinyl acetates; and necessary compatibilizers.

The preferred thermoplastic substrate for use herein is a polycarbonate sheet. Suitable polycarbonates may be prepared by reacting a dihydric phenol with a carbonate precursor, such as phosgene, a haloformate or a carbonate ester. Typically, these polycarbonates will have recurring structural units of the formula:

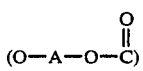

$$(O-A-O-\underset{\underset{O}{\|}}{C})$$

wherein A is a divalent aromatic radical of the dihydric phenol employed in the polymer producing reaction. Preferably, the aromatic carbonate polymers have an intrinsic viscosity ranging from 0.30 to 1.0 dl./g. (measured in methylene chloride at 25° C.) By dihydric phenols is meant mononuclear of polynuclear aromatic compounds containing two hydroxy radicals, each of which is attached to a carbon atom of an aromatic nucleus. Typical dihydric phenols include 2,2-bis-(4-hydroxyphenyl)propane; 2,2-bis-(3,5-dimethyl-4-hydroxyphenyl)propane, 4,4'-dihydroxy-diphenyl ether, bis(2-hydroxyphenyl)methane, mixtures thereof and the like. The preferred aromatic carbonate polymer for use herein is a homopolymer derived from 2,2-bis(4-hydroxyphenyl)propane, i.e., bisphenol-A.

Also preferred for the use as the substrate herein is copolyester-carbonate sheet. The copolyester-carbonates constituting the substrate of the present invention contain recurring carbonate groups:

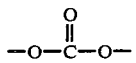

and carboxylate groups:

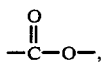

in the polymer chain. These groups may occur either randomly or as blocks with the number of ester bonds, relative to the number of carbonate bonds, generally being in the range of from about ½ to about 6/1. The preferred copolyester-carbonates include the aromatic copolyester-carbonates derived from bisphenol A; phosgene; and isophthalic acid, terephthalic acid, or the reactive derivatives of these acids such as terephthaloyl dichloride, isophthaloyl dichloride, or mixtures thereof. Preferably, both isophthalic acid and terephthalic acid are employed in the copolyester-carbonate monomer mix. Additional examples of the copolyester-carbonates and methods of their manufacture are disclosed in U.S. Pat. Nos. 3,030,331, 3,169,121, 3,207,814, 4,156,069, 4,188,314, and 4,194,038, which are incorporated herein by reference.

The thermosettable and thermoplastic acrylic polymers of the primer coat herein are well known in the art. Exemplary thermosettable or thermoplastic acrylics which may be employed in the practice of this invention are set forth, for example, in *Encyclopedia of Polymer Science and Technology*, Vol. 1, Interscience Publishers, John Wiley & Sons, Inc., copyright 1964, at page 273 et seq., page 246 et seq., and in *Chemistry of Organic Film Formers*, by D. H. Solomon, John Wiley & Sons, Inc., 1967 at page 251 et seq. and the references cited therein, all of which are incorporated herein by reference.

Suitable thermosettable acrylic polymers include: (I) acrylic copolymers having reactive functional groups which are capable of reacting between themselves to effect a cross-linkage thereof; (II) acrylic copolymers having reactive functional groups to which there is added an appropriate compatible cross-linking agent which will react with the functional groups to effect cross-linking; and (III) a mixture of two polymers having cross-linkable functional reactive groups.

Typically, the reactions involved in cross-linking the acrylic copolymers are reactions between, for example: epoxide functional groups and carboxyl functional groups; epoxide functional groups and N-methylol or N-methylol-ether functional groups; carboxyl functional groups and N-methylol or N-methylol-ether functional groups; inter-reactions between hydroxyl groups, for example, polyols, and isocyanate groups; and reactions between amine groups and N-methylol or N-methylol-ether functional groups.

The required functional group in the thermosettable acrylic copolymer is provided by employing in the copolymerization a monomer which may be either an acrylic or non-acrylic and supplies the required reactive functional group for cross-linking into the acrylic copolymer chain. Usually, this copolymerizable functional group-supplying acrylic or non-acrylic monomer will be present in lesser amounts, that is, on the order of from about 1 mole percent to about 25 mole percent and typically, between about 3 and 20 mole percent of the monomer which is polymerized. Exemplary of these functional group-supplying acrylic or non-acrylic monomers are glycidyl acrylate, glycidyl methacrylate, allyl glycidyl ether, t-butylaminoethyl-methacrylate, maleic anhydride, itaconic anhydride, allyl alcohol, monallyl ethers of polyols, hydroxyethyl methacrylate, hydroxypropyl methacrylate, hydroxypropyl acrylate, acrylamide, methacrylamide, maleamide, N-methylolmethacrylamide, vinyl isocyanate, allyl isocyanate.

The predominant group in the thermosettable acrylic copolymer is provided by employing in the copolymerization non-functional acrylic ester monomers. Typically, these non-functional acrylic esters are lower ($C_1$–$C_4$) alkyl acrylic esters or mixtures thereof, e.g., methyl acrylate, ethyl acrylate, methyl methacrylate, and ethyl methacrylate, and preferably, they constitute between about 75 mole percent to about 99 mole percent and, more typically, between about 80 mole percent to about 97 mole percent of the polymerized monomers of the acrylic primer layer.

The thermoplastic acrylic polymers of the instant invention differ from thermosettable acrylic polymers in that the thermoplastic polymers are formed, applied and utilized as primers under conditions such that functional groups, if present, do not react between themselves to effect a cross-linkage between the polymers.

Suitable thermoplastic acrylic polymers are derived from monomers which may be represented by the general formula:

where Y is H or a methyl radical, $R^5$ is a $C_{(1-12)}$ alkylene radical, X is a member selected from hydrogen, hydroxy, carboxy, amine, epoxide, amide, —SH,—$SO_3H$, —$COOR^6$, and -$Si(OR^7)_3$, where $R^6$ and $R^7$ are $C_{(1-20)}$ organic radicals.

Radicals included by $R^6$ and $R^7$ are for example, ethyl, methyl, propyl, isopropyl, butyl, t-butyl, pentyl, hexyl, heptyl, 2-ethylhexyl, and octyl. Radicals included by $R^5$, are for example, methylene, ethylene, propylene, isopropylene, butylene, t-butylene, pentylene, hexylene, heptylene, 2-ethylhexylene, and octylene. In instances where the aforementioned $R^5$–$R^7$ radicals can represent more than one radical, these radicals can be the same or different.

There are included within the acrylic acid ester monomers of Formula 1 compounds such as methyl acrylate, isopropyl acrylate, n-propyl acrylate, n-butyl acrylate, isobutyl acrylate, sec-butyl acrylate, 2-ethylhexyl acrylate, etc. Exemplary methacrylic acid ester monomers of Formula 1 include methyl methacrylate, ethyl methacrylate, n-butyl methacrylate, isobutyl methacrylate, hexyl methacrylate, etc. Acrylic ester monomers that are usually considered functional are also included in Formula 1, however, the functional groups must be selected in such a way that they will not react between themselves to form cross-linking within the primer layer.

The polymerization of the monomeric acrylic acid esters and methacrylic acid esters to provide the thermoplastic acrylic polymers useful in the practice of the invention may be accomplished by any of the well known polymerization techniques. The thermoplastic acrylic polymers having a molecular weight of at least about 15,000 and preferably greater than 50,000 are preferred.

Acrylic ester homopolymers derived from acrylic acid ester monomers; methacrylic ester homopolymers derived from methacrylic acid ester monomers; and copolymers derived from two different acrylic acid ester monomers, or two different methacrylic acid ester monomers, or an acrylic acid ester monomer and a methacrylic acid ester monomer are useful in the instant invention. In addition, blends of two or more of the aforedescribed thermoplastic acrylic polymers, e.g., two or more different acrylic ester copolymers, two or more different methacrylic ester copolymers, an acrylic ester homopolymer and a methacrylic ester homopolymer, an acrylic ester copolymer and an methacrylic ester copolymer, and acrylic ester homopolymer and a methacrylic ester copolymer, etc., can also be used in the present invention.

For blending and application, the above acrylics can either be emulsified or dissolved in a liquid carrier system. Suitable liquid carrier systems for use with emulsion borne acrylics contain relatively high weight ratios of water to organic solvent. Too low a such ratio will lead to breakdown of the emulsion with a concomitant coagulation of the the acrylic. Conversely, liquid carrier systems for use with solvent borne acrylics contain relatively low weight ratios of water to organic solvent. At this opposite extreme, too high a such ratio will lead to precipitation with a concomitant coagulation of the acrylic. In the latter case, water may be completely eliminated from the liquid carrier system. Persons skilled in the art of such liquid carrier systems may readily determine proper and desirable ratios of water to organic solvent to obtain suitable acrylic emulsions or solutions.

Organic solvents suitable for use in the above liquid carrier systems are organic liquids which dissolve or swell the thermosettable or thermoplastic acrylics described above but are not so aggressive that they will injure or attack the thermoplastic substrates. Generally, such organic solvents are alcohols, ethers, esters, or ketones. Preferred such organic solvents have hydroxyl groups to lessen their aggressiveness to the substrate. Recommended organic solvents are the alkanols or hydroxy ethers. Recommended hydroxy ethers are represented by the general formula:
$R^1—O—R^2—OH$ (2)

wherein $R^1$ is an alkyl radical and $R^2$ is an alkylidene radical and preferably, the sum of the carbon atoms present in $R^1$ and $R^2$ is from 3 to about 10. Recommended alkanols preferably contain from 1 to 4 carbon atoms and include methanol, ethanol, isopropanol, t-butanol and the like.

The organopolysiloxanes suitable for use in the hardcoat and primer of the present invention are described in U.S. Pat. Nos, 3,888,815, 3,701,753, 4,284,685, and 4,308,317. Broadly, these organopolysiloxanes may be described as the solid condensation products of the partial condensates of silanols derived from compounds having the general formula:

$$R^3_a SiZ_{(4-a)} \qquad (3)$$

wherein each $R^3$ is independently a monovalent hydrocarbon radical or a halogenated monovalent hydrocarbon radical, Z represents a hydrolyzable group, and a may, on average, vary from 0 to 2. More specifically, each Z is independently a member of one or more of the following hydrolyzable groups: halogen, alkoxy, acyloxy and aryloxy.

Preferably, $R^3$ represents an alkyl radical containing from 1 to about 6 carbon atoms such as methyl, ethyl, and propyl through hexyl (both normal and isomeric); an alkenyl radical containing from 2 to about 6 carbon atoms, such as vinyl and propenyl; a phenyl radical; a halogenated alkyl radical containing from 1 to about 6 carbon atoms such as the 3,3,3-trifluoropropyl radical; a glycidoxyalkylene radical containing from 2 to about 6 carbon atoms such as the gamma-glycidoxypropyl radical; or an acrylic ester radical such as the gamma-methacryloxypropyl radical containing from about 4 to about 6 carbon atoms. Preferably, Z represents an alkoxy radical containing from 1 to about 6 carbon atoms such as methoxy, ethoxy, propoxy, hexoxy and the like; a phenoxy radical; an acyloxy radical containing from 2 to about 6 carbon atoms such as acetoxy, propanoyloxy, butyroyloxy, pentanoyloxy, hexanoyloxy, and the like; or a benzoyloxy radical.

Especially preferred compounds of Formula 3 are silanes of the formula $$R^3_a Si(OR^4)_{4-a} \qquad (4)$$

and silanes of the formula $$R_a^3 Si(O\overset{\overset{\displaystyle O}{\|}}{C}R^4)_{4-a} \qquad (5)$$

wherein $R^3$ and a are as defined above; and $R^4$ represents monovalent alkyl and phenyl radicals and halogenated monovalent alkyl and phenyl radicals containing from 1 to about 6 carbon atoms.

Upon hydrolysis, the silanes of Formulae 4 and 5 are converted to the corresponding silanols producing as a by-product the corresponding alcohols and acids. Following generation of the silanol, there is a partial condensation of the hydroxyl substituents to form —Si—O—Si— bonding. The condensation is not complete, but rather the organopolysiloxane retains a quantity of residual silicon-bonded hydroxyl groups. This partial condensate can be characterized as a furthercurable, i.e., further condensable, siloxanol polymer. Generally, during curing of the further-curable organopolysiloxane these residual hydroxyl groups condense to give a siloxane represented by the formula:

$$R^3_a SiO_{(4-a)/2} \qquad (6)$$

wherein $R^3$ and a are as defined above.

In preferred embodiments, colloidal silica is present during the hydrolysis of the silanes to silanols and particularly during the subsequent condensation of the silanols to siloxanes. The colloidal silica particles generally have a particle size in the range 5 to 150 millimicrons in diameter. Preferred colloidal silicas contain surface bonded silanols which react during condensation with the liquid silanols of the hardcoat composition to make the colloidal silica particle an integral chemically bonded constituent of the cured hardcoat layer. Generally, colloidal silica is added to the silanol solution prior to condensation in a weight ratio to silanol of from about 1/9 up to about 2/1. Colloidal silica is distinguished from other water dispersable forms of $SiO_2$, such as nonparticulate polysilicic acid or alkali metal silicate solutions, which are not operative in the practice of the present invention.

The most preferred class of further-curable organopolysiloxanes which are employed in the present invention are the hydrolysis and condensation products of trialkoxysilanes or mixtures thereof, i.e. the silanes of Formula 4, wherein $R^4$ is preferably methyl, but may be an alkyl group containing up to three carbon atoms, $R^3$ is at least 70% methyl, and a is 1.

The hydrolysis of the alkyloxy and aryloxy silanes generally requires the addition of an acid catalyst. Suitable acids include both organic and inorganic acids such as hydrochloric, chloroacetic, acetic, citric, benzoic, formic, propionic, maleic, oxalic, glycolic and the like. The acid can be added to either the silane, which hydrolyzes to form the silanol component of the composition, or to the water phase prior to mixing the two compounds.

Thus, the silanol partial condensates used in the present invention as both a primer additive and hard coat are generally prepared by a process wherein the alkyltrialkoxysilane, aryltrialkoxysilane, or a mixture of alkyltrialkoxysilane and aryltrialkoxysilane is heated in the presence of water wherein the molar ratio of water to total silane is at least about 1.5:1, in the presence of an effective amount of a hydrolysis catalyst such as a mineral acid, for example, hydrochloric acid, and in the presence of colloidal silica. The heat is maintained for about 1 to about 10 hours at a temperature between ambient and reflux to produce a siloxane partial condensation product.

The partial condensate of the silanol is generally dissolved in a the products of condensation, additional organic solvents, and an optional acid. Of course, depending upon intended use, i.e., as additive to the primer or as hardcoat composition, it may be required to adjust concentration of this solution either upwards or downwards. Concentration may be adjusted upwards by evaporation or downwards by dilution of the hydrolysis and condensation solution.

The primer composition of the present invention as applied to the thermoplastic substrate is prepared by blending the solution of partially condensed silanols with the acrylic emulsion or solution. Generally, it is desirable to add the solution of partially condensed silanols to the acrylic emulsion or solution to the point where the solid condensation products of the partially condensed silanols will have a weight ratio to the acrylic ranging from about 1/14 up to about 9/6. Care should be taken in this blending step that the resultant primer composition be in the concentration range that the acrylic constituent is either emulsified or in solution and not coagulated. To achieve this end, the organic solvent-water content of the acrylic solution or emulsion and solvent-water content of the organopolysiloxane solution must be determined in view of one another to result in a primer composition of the proper concentration to prevent coagulation. Additionally, it should be kept in mind that generally, acrylic emulsions are pH sensitive, and thus, in order to maintain the emulsion, it may be necessary to avoid affecting the pH of such emulsion upon the addition of the organopolysiloxane solution. Of course, the primer composition itself may be adjusted either upward or downwards in concentration as necessary.

Generally, primer compositions containing the thermosettable acrylics are applied to form a cured primer layer of lesser thickness than primer compositions containing the thermoplastic acrylics. Thus, primer coat compositions containing the thermosettable acrylics are usually less concentrated and less viscous than those primer coat compositions containing the thermoplastic acrylics. Preferably, cured primer layers containing the thermoset acrylics are from about 0.005 mil to about 0.05 mil in thickness and dried primer layers containing the thermoplastic acrylics are from about 0.005 to about 0.10 mils in thickness. A primer layer less than about 0.005 mils or greater than about 0.15 mils in thickness shows marked decrease in adhesion and weatherability. To provide a primer layer which falls within the required thickness ranges, generally requires that the primer compositions contain a weight ratio of solid to liquid carrier ranging from about ¼ down to about 1/99.

An optional ultraviolet light absorbing or stabilizing compound may be added to the primer. It is preferred that a sufficient amount of an ultraviolet light absorbing or stabilizing compound be added to provide a siloxane and acrylic solids to ultraviolet light absorber or stabilizer weight ratio of from about 5/1 down to about ⅓. The ultraviolet light absorbing or stabilizing system can be one which contains only one ultraviolet light absorbing or stabilizing compound or it can contain a mixture of two or more ultraviolet light absorbing or stabilizing compounds.

Suitable ultraviolet light absorbing or stabilizing compounds are well known in the art and readily available. Illustrative of suitable absorbing compounds are the hydroxy benzophenones, the benzotriazoles, the cyanoacrylates, or the benzylidene malonates. Additionally, suitable ultraviolet light stabilizing compounds are the hindered amines and nickel thiocarbamates. More specific examples of ultraviolet light absorbers may be found in U.S. Pat. No. 3,043,079 which is incorporated herein by reference.

In the method of the present invention, a thin layer of the primer composition is applied onto the thermoplastic substrate by any of the well known methods such as spraying, dipping, roll-coating and the like. The liquid carrier is then evaporated off, as by air drying or mild heating, to leave an even and uniform layer of solids. Subsequently or simultaneously, the primer is generally heated to temperatures ranging between about 90° C. to about 165° C. for times between ¼ hour and 72 hours in order to crosslink the acrylic, if thermoset acrylic is present, and to cure the partially condensed silanol primer additive to a solid organopolysiloxane.

The primer compositions of the instant invention may also optionally contain various flatting agents, surface-active agents, stabilizers such as antioxidants, and thixotropic agents. All of these additives and the use thereof are well known in the art and do not require extensive discussion. It is understood that any compounds possessing the ability to function in such a manner, i.e., as a flatting agent, surface-active agent, and stabilizer, can be used provided they do not adversely affect adhesion.

The organopolysiloxane hardcoat on the primed substrate is produced by applying, drying and curing a partially condensed silanol solution described above. In those cases where evaporation is employed to concentrate the hardcoat composition, the viscosity of the composition should not exceed the practical useable limits of the method of application chosen and preferably, the viscosity should not exceed 50cS. In those cases where dilution of the further curabe organopolysiloxane solution is desired, additional alcohol, water, or a water-miscible solvent may be added. The hardcoat composition is generally applied comprising a solvent system of water, alcohol, and/or acid and other solvents with a concentration of the partially condensed silicone-containing products from about 10% to about 50% by weight. The solvent system should contain a least about 20% by weight alcohol, acid or water-miscible solvent to ensure solubility of the siloxanol formed by the condensation of the silanol.

The hardcoat compositions containing the aforedescribed siloxanes are applied by brushing, dipping, spraying or flowing the partially condensed silanol solution onto the primer layer. The thickness of the hardcoat generally is dependent upon the weight percent further-curable siloxane containing solids in the hardcoat composition. In general, the higher the percent solids and the longer the application time, the greater the thickness of the hardcoat. It is preferred that the cured hardcoat have a thickness of from about 0.05 to about 0.5 mil, more preferably from 0.10 to about 0.4 mil, and most preferably from about 0.15 to about 0.3 mil.

Following application of the hardcoat composition to the primer, the solvent or alcohol by-product and water present in the hardcoat composition is evaporated and the residual further curable organopolysiloxane is cured to form a organopolysiloxane hardcoat. Although certain catalysts may be utilized to accelerate the cure of the further-curable organopolysiloxane, such catalysts are not necessary if the furthercurable organopolysiloxane is cured at an elevated temperature for a sufficient length of time. Typically, curing is effected at temperatures ranging from about 90° C. to about 165° C. for times between about ¼ hour and 72 hours. Of course, if the glass transition temperature of the thermoplastic substrate is exceeded, then the thermoplastic substrate may become deformed and lose its utility.

Thus, in the manner of the present invention, thermoplastic substrates are provided with a primer layer hardcoat which retains excellent adhesion to both the substrate and an organopolysiloxane hardcoat, even after aging and exposure to weathering. In order that those skilled in the art may better understand and more easily practice the present invention, the following examples are given by way of illustration and not by way of limitation.

Tests

Watersoak Adhesion Test (WSAT)

The sample is immersed in a 65° C. water bath and periodically tested in accordance with the procedure of ASTM-D3359 Method B. Samples which attain a rating of 5B according to the ASTM standard are re-immersed to continue soaking. Samples which show any flaking or detachment of the squares in the lattice are failed and the reported figure is the number of days which the sample was soaked before such flaking or detachment of the squares in the lattice was observed.

Accelerated Weathering Test (AWT)

The sample is placed in an Atlas Electric UVCON accelerated weathering tester set to a cycle of 8 hrs light at 60° C. and 4 hours dark at 50° C. and generally tested in accordance with the procedure of ASTM-D3359 Method B. Samples which obtain a rating of 5B according to the ASTM standard are placed back into the tester and exposure is continued. Samples which show any flaking or detachment of the squares in the lattice are failed and the reported figure is the number of hours which the sample was exposed before such flaking or detachment of the squares in the lattice was observed.

Taber Abrasion Test (Taber)

The sample is tested in accordance with the procedure of ASTM-D-1044-78 using a CS-10F wheel, 500 g load, and 500 cycles. The reported figure is the percentage of transmitted light that is scattered by the abraded specimens.

Ingredients

Silicone Composition A—112 weight parts a partially condensed silanol of 70 weight parts methyl trimethoxysilane derivative, 30 weight parts colloidal silica, and 12 weight parts a silylated 2,4-dihydroxybenzophenone is suspended or dissolved in 400 weight parts of the condensation by-products and an additional solvent of a 50/50 weight ratio i-butyl alcohol/isopropanol; the total composition having a pH of about 7.5.

Silicone Composition B—Dow Corning ARC silicone resin (Q96313), 20% silicone solids, is generally described in U.S. Pat. No. 3,986,997, Clark.

Thermoset Acrylic Emulsion—3 Weight parts HYCAR 237 acrylic emulsion and 3 weight parts HYCAR 256 acrylic emulsion, each a 50/50 weight ratio thermoset acrylic water emulsion manufactured by B. F. Goodrich, are blended with 67 weight parts water and 30 weight parts 2-butoxy ethanol.

EXAMPLES 1-3

6"×8" Polycarbonate test panels having a thickness of ¼" were flow coated with primer compositions having formulations as shown below and either oven dried for 20 minutes at 260° F. or air dried at room temperature to a non-critical thickness of about 0.04 mils. Subsequently, the primed test panels were flow coated with Silicon Composition A and dried for 1 hour at 260° F. to a non-critical top-coat thickness of about 0.25 mils.

TABLE 1

|  | 1 | 2 | 3 |
|---|---|---|---|
| Silicone Composition A | — | 1.8 | 3.75 |
| Poly(ethylmethacrylate)[1] | 3.0 | 3.0 | 3.0 |
| 2-butoxy ethanol | 67.9 | 67.9 | 67.9 |
| Diacetone alcohol | 29.1 | 29.1 | 29.1 |
| WSAT (Days) | | | |
| oven | 5 | 10+ | 10+ |
| air | 5 | 9 | 9 |
| AWT (hours) | | | |
| oven | 1000 | 1800 | 2100 |
| air | 1100 | 1300 | 1500 |

[1] i.v. = 0.85

EXAMPLES 4-9

6"×8" Polycarbonate test panels having a thickness of ¼" were flow coated with primer compositions having formulations as shown below and oven dried for 20 minutes at 260° F. to a non-critical thickness of about 0.04 mils. Subsequently, the primed test panels were flow coated with Silicone Composition A and dried for 1 hour at 260° F. to a non-critical top-coat thickness of about 0.24 mils.

TABLE 2

|  | 4 | 5 | 6 | 7 | 8 | 9 |
|---|---|---|---|---|---|---|
| Silicone Composition A | 0.5 | 1.0 | 2.0 | 4.0 | 8.0 | 9.0 |
| Poly(methylmethacrylate)[2] | 2.9 | 2.8 | 2.6 | 2.2 | 1.4 | 1.2 |
| 2-butoxy ethanol | 67.5 | 67.1 | 66.3 | 64.7 | 61.5 | 60.7 |
| Diacetone alcohol | 29.1 | 29.1 | 29.1 | 29.1 | 29.1 | 29.1 |
| WSAT (days) | 10+ | 6 | 1 | 10+ | 10+ | 0 |
| AWT (hours) | 100 | 200 | — | 1900+ | 1900+ | — |
| Taber (%) | 5 | 9 | 25 | 8 | 6 | 20 |

[2] i.v. = 1.3

EXAMPLES 10-11

6"×8" Polycarbonate test panels having a thickness of ¼" were flow coated with primer composition having formulations as shown below and oven dried for 20 minutes at 260° F. to a non-critical thickness of about 0.04 mils. Subsequently, the primed test panels were flow coated with Silicone Composition A and dried for 1 hour at 260° F. to a non-critical top-coat thickness of about 0.25 mils.

TABLE 3

|  | 10 | 11 |
|---|---|---|
| Silicone Composition A | — | 10.0 |
| Silicone Composition A'[3] | 10.0 | — |
| Poly(methylmethacrylate)[4] | 2.0 | 2.0 |
| 2-butoxy ethanol | 59.2 | 59.2 |
| Diacetone alcohol | 28.8 | 28.8 |
| WSAT (days) | 12+ | 12+ |
| AWT (hours) | 1350 | 1500 |

[3] lacks the presence of silylated 2,4-dihydroxy benzophenone
[4] i.v. = 1.3

EXAMPLES 12-17

6"×8" Polycarbonate test panels having a thickness of ¼" were flow coated with primer compositions having formulations as shown below and oven cured for 1 hour at 260° F. to a non-critical thickness of about 0.02 mils. Subsequently, the primed test panels were flow coated with Silicone Composition B and dried for 1 hour at 260° F. to a non-critical top-coat thickness of about 0.25 mils.

TABLE 4

|  | 12 | 13 | 14 | 15 | 16 | *17 |
|---|---|---|---|---|---|---|
| Silicone Composition B | 0 | 1 | 2 | 3 | 4 | 5 |
| Themoset Acrylic Emulsion | 20 | 20 | 20 | 20 | 20 | 20 |
| WSAT (days) | 10+ | 10+ | 10+ | 6 | 2 | — |
| AWT (hours) | 300 | 600 | 450 | 300 | 150 | — |

*coagulation of the primer composition

What is claimed is:

1. An article comprising a thermoplastic substrate, having adhered on at least one surface a primer layer, said primer layer comprising in admixture:
   (i) a thermoplastic acrylic polymer or the solid reaction products of a thermosettable acrylic polymer, and
   (ii) solid condensation products of partial condensates of silanols derived from compounds having the general formula:

$$R^3{}_a SiZ_{(4-a)}$$

wherein $R^3$ is selected from a monovalent hydrocarbon radical or halogenated monovalent hydrocarbon radical, a is 0, 1, or 2, and Z is independently a member of one or more hydrolyzable groups, said condensation products being in weight ratio to the acrylic of from about 1/14 up to about 9/6.

2. The article of claim 1 wherein said primer layer additionally contains colloidal silica chemically bonded to said solid condensation products of said partial condensates of silanols.

3. The article of claim 1 wherein said primer layer additionally contains a UV light absorbing or stabilizing compound.

4. The article of claim 1 wherein said primer layer has a thickness of from about 0.005 to about 0.15 mil.

5. The article of claim 1 wherein said primer layer is adhered to a polycarbonate thermoplastic substrate.

6. The article of claim 1 wherein said primer layer is adhered to a copolyester-carbonate thermoplastic substrate.

7. The article of claim 1 wherein a is 1 and said $R^3$ is at least 70% by number methyl with the balance selected from the group consisting of an alkyl radical containing from 1 to about 6 carbon atoms, an alkenyl radical containing from 2 to 6 carbon atoms, a phenyl radical, a halogenated alkyl radical containing from 1 to about 6 carbon atoms, a glycidoxy alkylene radical containing from 2 to about 6 carbon atoms, and an acrylic ester radical containing from 4 to about 6 carbon atoms.

8. The article of claim 1 wherein said primer layer is adhered on one surface to a hardcoat layer comprising solid condensation products of partial condensates of silanols derived from compounds of the general formula:

$$R^3{}_a SiZ_{(4-a)}$$

wherein $R^3$ is selected from a monovalent hydrocarbon radical and halogenated monovalent hydrocarbon radical, a may be 0, 1, or 2, and Z is independently a member of one or more hydrolyzable groups.

9. The article of claim 8 wherein a is 1 and $R^3$ is at least 70% by number methyl with the balance selected from the group consisting of an alkyl radical containing from 1 to about 6 carbon atoms, an alkenyl radical containing from 2 to 6 carbon atoms, a phenyl radical, a halogenated alkyl radical containing from 1 to about 6 carbon atoms, a glycidoxy alkylene radical containing from 2 to about 6 carbon atoms, and an acrylic ester radical containing from 4 to about 6 carbon atoms.

10. The article of claim 8 wherein said hardcoat layer additionally comprises colloidal silica chemically bonded to said solid condensation products of partial condensates of silanols.

11. The article of claim 8 wherein said hardcoat layer has a thickness of from about 0.05 mil to about 0.5 mil.

* * * * *